United States Patent
Chen et al.

(10) Patent No.: US 7,435,276 B2
(45) Date of Patent: Oct. 14, 2008

(54) ABRASIVE PARTICLES HAVING COATINGS WITH TORTUOUS SURFACE TOPOGRAPHY

(75) Inventors: Zheng Chen, Dublin, OH (US); Richard John Goetz, Dublin, OH (US)

(73) Assignee: Diamond Innovations, Inc., Worthington, OH (US)

( * ) Notice: Subject to any disclaimer, the term of this patent is extended or adjusted under 35 U.S.C. 154(b) by 236 days.

(21) Appl. No.: 10/842,184

(22) Filed: May 10, 2004

(65) Prior Publication Data

US 2005/0022457 A1 Feb. 3, 2005

Related U.S. Application Data

(60) Provisional application No. 60/469,285, filed on May 9, 2003.

(51) Int. Cl.
*B24D 3/00* (2006.01)
*B24D 3/06* (2006.01)
*B24D 3/04* (2006.01)
*B24D 17/00* (2006.01)
*C09K 3/14* (2006.01)
*B23D 61/00* (2006.01)
*B23D 61/18* (2006.01)

(52) U.S. Cl. ............... 51/307; 51/308; 51/309; 51/295; 428/403; 428/404

(58) Field of Classification Search ............ 51/298, 51/307–309, 295; 428/403, 404
See application file for complete search history.

(56) References Cited

U.S. PATENT DOCUMENTS

| | | | | |
|---|---|---|---|---|
| 3,650,714 A | | 3/1972 | Farkas | |
| 4,157,897 A | * | 6/1979 | Keat | 51/295 |
| 4,435,189 A | | 3/1984 | Bovenkerk | |
| 5,024,680 A | | 6/1991 | Chen et al. | |
| 5,190,796 A | | 3/1993 | Iacovangelo | |
| 5,232,469 A | | 8/1993 | McEachron et al. | |
| 5,250,086 A | * | 10/1993 | McEachron et al. | 51/309 |
| 2002/0164931 A1 | * | 11/2002 | McHale et al. | 451/48 |
| 2003/0005646 A1 | | 1/2003 | McHale, Jr. | |

FOREIGN PATENT DOCUMENTS

| | | | |
|---|---|---|---|
| JP | 2000334663 | | 5/2000 |
| JP | 2000334663 | * | 12/2000 |

* cited by examiner

*Primary Examiner*—Michael A Marcheschi
(74) *Attorney, Agent, or Firm*—Pepper Hamilton LLP

(57) ABSTRACT

The present invention relates to abrasive composites having improved abrasive particle retention due to unique coating designs. The present invention describes coated abrasive particles having tortuous surface topography, a process for producing such coated abrasive particles, and products comprising such coated abrasive particles. The coated abrasive particles have an outer layer coating with highly tortuous surface comprising about 5 spikes and have a tortuosity of at least about 1.1. The coated abrasive particles may be used in composites including metal/metal alloy matrix composites, ceramic/glass matrix composites, and polymer based matrix composites.

21 Claims, 1 Drawing Sheet

ABRASIVE PARTICLES HAVING COATINGS WITH TORTUOUS SURFACE TOPOGRAPHY

CROSS REFERENCE TO RELATED APPLICATIONS

The present application claims priority to U.S. Provisional Application No. 60/469,285, filed on May 9, 2003, herein incorporated by reference in its entirety.

FIELD OF INVENTION

The present invention relates to novel coated abrasive particles having tortuous surface topography, a process for producing such coated abrasive particles, and products comprising such coated abrasive particles.

BACKGROUND

Abrasive materials and superhard materials, i.e., superabrasives such as natural and synthetic diamonds and cubic boron nitride, exhibit outstanding ability for machining both metallic and non-metallic materials. They are frequently used in saw blade and grinding tools as a cutting point to cut, grind, polish a variety of hard and abrasive materials. When abrasive or superabrasive particles reinforced metal or ceramic composites or polymer based composites are used to perform a task, such as cutting or grinding or polishing a highly abrasive workpiece, the particles in the composite take most of applied force due to their higher Young's modulus. The shear and tensile stress built along the interface between the particles and the matrix may be very significant. The superabrasive particles are often pulled out from the matrix due to weak interface bonding. Because most of abrasives/superabrasives have relatively smooth surfaces and are inert to most chemical substances, there is little mechanical or chemical bonding between the particles and the matrix.

Premature gross pull-out of only partially used abrasive particles ("grit") is a major factor in grinding wheel wear in resin, vitreous or metal bonds. Retention of diamond particles in the matrix, such as metals, ceramic, and polymer, is poor. As an example, diamond saw blades may lose up to 40% of the abrasive particles in the matrix during one cutting use.

An approach for enhancing the adhesion of abrasive and superabrasive particles to the resin, vitreous, or metal bond, may utilize bond compositions which are reactive with the abrasive particles so that during tool fabrication the bond composition adheres to the surface of the abrasive particles. For example, U.S. Pat. Nos. 5,190,796 and 5,232,469, both herein incorporated by reference, teach methods to improve the retention of diamonds in abrasive tools by providing/coating the diamond particles with multiple layers of metals, such as molybdenum, titanium, niobium, chromium, zirconium, copper and nickel. As another example, U.S. patent application Ser. No. 09/901,159, herein incorporated by reference, discloses incorporating a silane coupling agent into a mixture of metal coated superabrasive particles and resin bond matrix to enhance the bond between the coating and the resin matrix.

In another approach to enhance or increase the retention of the grits in the matrix, the surface of the diamond particles is modified. For example, U.S. Pat. No. 3,650,714, herein incorporated by reference, proposes adding ceramic whiskers during the coating of diamond with copper or nickel and also obtaining roughness by heating a mixture of sponge iron and braze coated diamond under a vacuum. As another example, U.S. Pat. No. 4,435,189, herein incorporated by reference, discloses metal coated abrasives with a controlled, rough textured surface, for improved adherence to resinous materials. The controlled, rough textured surface is prepared by interrupting the electroless coating process to passivate diamond surface and then reactivate the passivated surface each time with a catalytic material to control the metal deposition rate for "rougher" grit.

There is a need for an improved method to enhance the bond strength between coated abrasive/superabrasive particles and the matrix as well as the bond strength between the abrasive/superabrasive crystals and its metal coating. A novel and inventive approach to enhance the retention of coated abrasive particles in a matrix through the interface design has been found.

SUMMARY

An embodiment of the invention relates to a coated abrasive particle having a wear-resistant coating comprising one or more materials selected from the group consisting of nickel, cobalt, iron, chromium, tungsten, molybdenum, carbides, phosphorus, titanium, zinc, palladium, borides, nitrides, oxides, intermetallics, and mixtures thereof. In an embodiment, the coated abrasive particles may have one or more additional coating layers comprised of metal, metal alloys, or other suitable coating materials. Optionally, the coated abrasive particle has an outer surface topography characterized as having about 5 peaks per abrasive particle and a tortuosity T of about 1.1. Another embodiment of the present invention is a composite material comprising a plurality of coated abrasive particles in a matrix.

Another embodiment of the invention further relates to a method to improve particle retention in a composite matrix comprising coated abrasive particles for improved performance in areas of grinding, cutting, or polishing. The process comprises providing the abrasive particles with a coating comprising one or more materials selected from the group consisting of nickel, cobalt, iron, chromium, tungsten, molybdenum, carbides, phosphorus, titanium, zinc, palladium, borides, nitrides, oxides, intermetallics, and mixtures thereof. The coated abrasive particle may be coated with one or more coating layers. Optionally, the coated abrasive particles have an outer surface topography characterized as having an average of at least 5 peaks per abrasive particle and a tortuosity T of at least 1.1. Such coated particles may be dispersed in a matrix material.

Embodiments of the coated superabrasive particles may be used in machining applications such as saw blades, polishing tools, grinding tools, and cutting tools, and they may also be used in coating applications. Embodiments of the coated abrasive and superabrasive particles of the present invention may be used in applications, such as composite materials and articles in which increased bonding strength between the particles and matrix material would be beneficial.

Another embodiment of the present invention relates to a method of coating superabrasive/abrasive particles with three metallic layers. In this embodiment, the particles are coated with at least three different coatings: an outer layer, a diffusion layer, and a chemical forming layer. A first layer applied to the particles is a chemical forming layer wherein a chemical bond between the particles and the chemical forming layer is formed. A second layer is a diffusion layer, an intermediary layer that forms bonds between the chemical layer and the outer layer. An outer layer is applied to the diffusion layer, which then bonds the coated particles to the matrix.

BRIEF DESCRIPTION OF THE DRAWINGS

For a fuller understanding of the nature and advantages of the present invention, reference should be had to the following detailed description taken in connection with the accompanying drawings, in which.

DETAILED DESCRIPTION OF THE INVENTION

Figure 1:
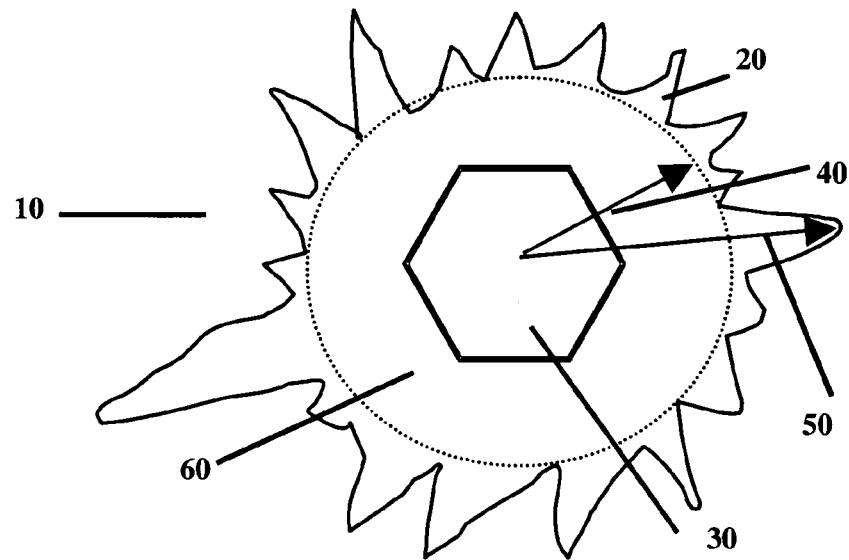
FIG. 1 is a schematic drawing illustrating the tortuous topography of the surface of the coated particles in one embodiment of the invention.

Before the present compositions and methods are described, it is to be understood that this invention is not limited to the particular processes, compositions, or methodologies described, as these may vary. It is also to be understood that the terminology used in the description is for the purpose of describing the particular versions or embodiments only, and is not intended to limit the scope of the present invention which will be limited only by the appended claims.

It must also be noted that as used herein and in the appended claims, the singular forms "a", "an", and "the" include plural reference unless the context clearly dictates otherwise. Thus, for example, reference to a "particle" is a reference to one or more particles and equivalents thereof known to those skilled in the art, and so forth. Unless defined otherwise, all technical and scientific terms used herein have the same meanings as commonly understood by one of ordinary skill in the art. Although any methods and materials similar or equivalent to those described herein can be used in the practice or testing of embodiments of the present invention, the preferred methods, devices, and materials are now described. All publications mentioned herein are incorporated by reference. Nothing herein is to be construed as an admission that the invention is not entitled to antedate such disclosure by virtue of prior invention.

Although the invention is described with reference to cutting and grinding tools, the coated particles herein described may be used in connection with a variety of composite materials and articles.

An embodiment of the present invention relates to coated abrasive particles having a tortuous topography on the outer surface of a coating layer. Applicants have surprisingly found that providing a coated particles with a tortuous surface varies the orientation of the interface relative to the global shear stress direction along the interface of the coated abrasive particles and a matrix. As a result, the mechanical interlock force resulting from the increased frictional force strengthens the interfacial bonding and resist interface movement, for increased abrasive product life, improved abrasive product performance, and increased particle retention within the matrix material.

As used herein, "abrasive" or "abrasives" refers to a conventional abrasive, a superabrasive or combination thereof. Conventional abrasives include, but are not limited to: aluminum oxide, silicon carbide, zirconia-alumina, garnet, emery, and flint. Superabrasives include, but are not limited to: natural and synthetic diamond, cubic boron nitride (CBN), and boron suboxide. Various combinations or mixtures of abrasive materials are also contemplated, such as, for example, mixtures of aluminum oxide and zirconia alumina, or mixtures of diamond and CBN. Another example of suitable abrasives are sol-gel derived abrasives. Examples of these are sol-gel alumina abrasive grits, which can be seeded or unseeded. As such, any of these abrasive materials are suitable in the embodiments of the present invention.

The average particle size of the abrasive grains (sometimes referred to as "grit") for use in the present invention can be determined by a variety of factors, such as the particular abrasive utilized, as well as the end use applications. In general, an average particle size for suitable superabrasives and abrasives is in a range of about between 0.5 and about 5000 micrometers. In another embodiment, abrasive particles may be in a range of between about 2 and about 200 micrometers. Other particle sizes are possible.

The abrasive grains of the present invention may be coated with one or more layers of a metal or metal alloy coating, wherein the coating comprises one or more of Al, Ag, Au, B, C, Co, Cu, Cr, Mg, Mn, P, Pd, Pt, Mo, Ni, Si, Sn, Ti, Zn, W, Sn, Y, Zn, Zr, alloys thereof, and mixtures thereof. The grains may be coated with one or several layers of metals of the same or different types, i.e., the inner layer adjacent to the abrasive particle surface being of one type of coating and the outer having the tortuous surface topography being of another material type. In several embodiments, the tortuous coating layer may be a single layer coating, such as a nickel boride (NiB), tungsten, copper or tin coating, a double layer coating, such as a tungsten/chromium (W/Cr) or a tungsten/nickel boride (W/NiB) coating, or even a triple layer coating, such as a nickel boride/tungsten/chromium (NiB/W/Cr) coating.

In one embodiment, the tortuous topography coating comprising one or more layers has a thickness of about 2 µm to 100 µm. In a second embodiment, the coated particles with tortuous topography have an average coating thickness of about 4 µm to 50 µm. Other thickness are possible.

Coated Particles Having Tortuous Surface Topography. For good particle retention in the composites of the invention, the outer layer of a coated abrasive particle may have a strong bond with the matrix material. The strong bond may be characterized by the highly tortuous surface topography on the outer surface of the coated abrasives, allowing for a mechanical interlock bonding. The strong particle retention may also be caused by diffusion bonding between the outer layer and the matrix.

The topography of the abrasive particles may vary in appearance/structure from non-uniform to substantially uniform and from discontinuous to continuous, with the appearance being in any or combinations of various shapes including chiral, spire-like, spike-like, helical, rod-like, plate-like, acicular, spherical, ellipsoidal, disc-shaped, irregular-shaped, plate-like, needle-like, twist, rotini, and honeycomb-like. The topography of the abrasive particles allows for increased surface contacts as well as a mechanical interlock to better retain the abrasives in the composite matrix.

A coated surface may be characterized as having an interface arranged at angles, including any coating surface that has protrusions, irregularities or imperfections arranged in any spike, peak, ridge, bump, mound, or any suitable shape. A surface may also have corrugated configurations. As used herein, the term "spike" refers to any of these protrusions or imperfections on the coating surface. The spikes or corrugated configurations also help with a reduced local stress state at the interface of the abrasive surface due to the tortuous surface interface.

In one embodiment of the invention, the average number of "spikes" per circumference (i.e., $2\pi R_A$) in the coated superabrasive particles is 5 or more. In a second embodiment of the invention, the average number of spikes or corrugated peaks is 7 or more. In yet a third embodiment of the invention, the average number of spikes or peaks is 10 or more. Other number of spikes are possible.

The coated superabrasive particles comprise one or more spikes. These spikes may be defined by at least two dimensions: the length from the center of the particle to the outermost peak of the spike and the length from the center of the particle to the base of the spike. Each of these two lengths may be determined for all the spikes found on a coating surface. As used herein, the tortuosity (T) of a coated abrasive particle is defined as the ratio of the average length from the center of the particle to the outermost peak of the spikes ($R_P$) divided by the average length from the center of the particle to the base the spikes ($R_A$). As shown in FIG. 1, the coated abrasive particle 10 is coated with a coating 60 having a surface comprising one or more spikes 20. The tortuosity T is defined as the average outermost peak length 50 ($R_P$) divided by the average base length 40 ($R_A$)

In one embodiment of the invention, coated abrasive particles have a T in the range of about 1.05 to about 1.70. In a preferred embodiment, the T value is in the range of about 1.10 to about 1.70. In a more preferred embodiment, the T value is greater than about 1.10. In yet a more preferred embodiment, the T value is greater than about 1.15. Other T values are possible.

Process for Making Coated Particles Having Tortuous Topography. The coated particles of the present invention can be made by conventional coating methods known in the art. Such methods include, for example, electroless plating, chemical reduction, sputtering chemical vapor deposition, physical vapor deposition, plasma assisted chemical vapor deposition, a fluidized bed process followed by a sintering process, or a combination thereof for single or multiple layers of coatings, optionally followed by a reaction heat treatment, thermal pyrosis, plating, or sol-gel process.

The coating process may be carried out under conditions such that the deposition/plating/sputtering of the metal coating layer being controlled for a modified coating surface with tortuous/corrugated properties. Although not to be bound by theory, it is believed that enhanced electroless deposition rate at high temperatures, i.e., with the deposition becoming less uniform, helps increase the tortuosity T and provide a coated surface with multiple spike configurations.

The abrasive particles may be coated with one or more coating layer by any suitable method. For example, U.S. Pat. No. 3,779,873, herein incorporated by reference, discloses a method to electrolytically metal plate diamond particles. U.S. Pat. No. 5,024,680, herein incorporated by reference discloses the use of a chromium, titanium, or zirconium carbide-forming layer as part of a multi-layer coating on diamond particles. U.S. Pat. No. 5,232,469, herein incorporated by reference, discloses multi-layer coated diamond abrasive particles having improved wear performance in abrasive tools, wherein the coating comprises a single homogenous, carbide forming metal primary layer, preferably of chromium, and at least one non-carbide forming secondary layer applied by electroless deposition, preferably comprised of nickel/phosphorus or cobalt/phosphorus.

The coated abrasive particles may be incorporated into a matrix material in any suitable method. For example, one such process is described in U.S. Pat. No. 6,156,390, herein incorporated by reference. A method to metal plate articles by the co-deposition of fluorinated carbon and diamond material with electroless metal is provided, wherein the diamond material is in the form of synthetic diamonds. One example of an electroplated coating is a composite coating that comprises an electroless nickel layer having wear resistant particles incorporated within the layer. The particles, which may be either silicon carbide or diamond, are co-deposited as the nickel layer forms onto the base material.

In one embodiment of the invention, a highly tortuous surface topography is obtained by selecting adequate outer layer alloys based on the type of matrix into which the coated particles will be included.

Figure 2:
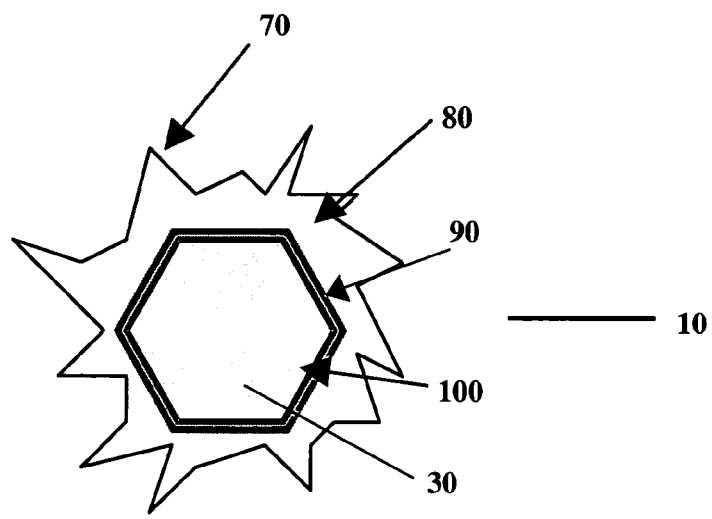
FIG. 2 is a schematic drawing showing the coating design of the coated particles in one embodiment of the invention.

Coated Particles Coated with Three Coating Layers Having Tortuous Topography. In another embodiment, the coating is comprised of three different layers to further optimize the particle retention properties in the composites as illustrated in FIG. 2. FIG. 2 illustrates a coated particle 10 according to one embodiment of the present invention. A abrasive particle 30 is coated with a chemical forming layer 100, a diffusion layer 90, and an outer layer 80. The tortuous surface topography 70 of the outer layer 80 results in increased bonding strength between the coated particles and the matrix.

The first layer is a chemical forming layer 100 that may be a carbide or nitride oxide forming layer which forms a chemical bond between the abrasive particle 30 and the chemical forming layer 100. The process for the coating of any of the three layers illustrated in FIG. 2 may be chemical vapor deposition (CVD), physical vapor deposition (PVD), and plasma assisted chemical vapor deposition, thermal pyrosis, or sol-gel process, followed by a reaction heat treatment. The thickness of each layer illustrated in FIG. 2 may be in the range of about 0.1 μm to about 10 μm.

The second layer is a diffusion layer 90 that may be a metal alloy, such as Co based alloys, Ni based alloys, Cu based alloys and mixtures thereof. In one embodiment of the invention, the alloys have an operating temperature in the range of about 600-1150° C. The alloy elements may be Al, Ag, Au, B, C, Co, Cu, Cr, Mg, Mn, P, Pd, Pt, Mo, Ni, Si, Ti, Zn, W, Sn, Y, Zn, Zr and mixtures thereof The diffusion coating 90 is an intermediate layer between the chemical forming layer 100 and outer layer 80. In one embodiment, the diffusion layer 90 provides an intermediate bond between the chemical layer 100 and outer layer 80 by a diffusion process through thermal treatment before sintering or during sintering. The intermediate bond may form a diffusion bond, such as Cr/Cu/Ni, Ti/Cu/Ni, Sn/Pd/Ni, Zn/Ni, Cr/Ni, Cr/Pd/Ni, Cr/P/Ni, Ti/Ni, Ti/Pd/Ni, Ti/P/Ni, or other Ni or Co based alloy, or intermetallic bond such as $Al_xNi_y$, $Ti_xCu_y$, $Ni_xTi_y$, and $Ni_xSn_y$. In one embodiment, the average thickness of the diffusion layer 90 is in the range of about 0.05 μm to about 10 μm. In a second embodiment, it is between about 0.1 μm to about 5 μm. Thus the diffusion layer 90 acts to bond the particle 30 to the chemical forming layer 100.

The third layer is the outer layer 80, and with the intermediate bonds, this outer layer can strongly bond the particle 30 to the matrix material. In one embodiment, the outer layer is comprised of Ni, Co, Cu based alloys and mixtures thereof. That alloy elements may be Al, Ag, Au, B, C, Co, Cu, Cr, Mg, Mn, P, Pd, Pt, Mo, Ni, Si, Sn, Ti, Zn, W, Sn, Y, Zn, and Zr based alloys.

Composites and Articles Comprising the Coated Abrasives of the Invention. The coated abrasives having tortuous topography of the invention may be used in abrasive composites, e.g., metal/metal alloy matrix composites, ceramic/glass matrix composites, polymer based matrix composites and mixtures thereof. In one embodiment, the coated abrasive particles are used in a concentration of about 10% to about 100% by volume of the total composite volume.

In one embodiment, the coated abrasives are surrounded in a matrix of a metal, such as Ni, Cu, Fe, Co, Sn, W, Ti, alloys thereof and mixtures thereof. In another embodiment, a polymer based matrix composite is suitable and the abrasives are used in a composite comprising a resin, such as phenol formaldehyde. Other resins or organic polymers may be used such as melamine or urea formaldehyde resins, epoxy resins, polyesters, polyamides, polyimides, poly(phenyl sulfide) polybenzoxazole, polycarbonate, polyepoxide, polyplithalanfide, polyketone, and mixtures thereof. In another embodiment, the composite matrix comprises oxides selected from $SiO_2$, $Al_2O_3$, ZrO, MgO, and mixtures thereof.

Example Applications. The coated abrasives and composites comprising the coated abrasive particles of the present invention may be used in any suitable application including cutting tool blanks, wire dies, drill blanks, coating applications and the like. The cutting tool blanks can be used in dressing or cutting tools, in machining and woodworking tools such as grinding wheels, saw blades, wire saws, drills, honing tools, or as a bearing element, and the like.

EXAMPLES

The examples below are merely representative of the work that contributes to the teaching of the present invention, and the present invention is not to be restricted by the examples that follow.

Coated Diamond Particles having Tortuous Topography. Diamond particles having a mesh particle size ranging from 30/40, 40/50, 50/60, 70/80, and 170/200, commercially available from Diamond Innovations, Inc. of Worthington, Ohio, were coated to have tortuous surface topography. Diamond particles were placed into a 20-gallon sized plating vessel with an electroless nickel plating solution. Agitation was provided by an air driven impeller. The particulate matter was uniformly dispersed throughout the plating solution.

A reducing agent component comprising sodium hypophosphite, was added to the plating solution at a rate of about 0.5 ml/sec to about 4 ml/sec. The addition caused the plating reaction to begin and plating continued for about a few hours at a process temperature of about 145° F. to about 170° F., until substantially all of the nickel was depleted from the plating solution. The coated diamond particulate was removed from the vessel and dried in an oven. In one embodiment, the tortuousity was adjusted by increasing temperature at or above about 145° F. In one embodiment, the above process was repeated multiple times to get the desired tortuosity.

Composite Bending Examples. Composites made with the coated diamonds according to one embodiment of the present invention, having a tortuosity T of about 1.1, were compared with composites comprising uncoated diamonds. Various tests revealed that the composites comprising the coated diamonds show at least 25% strength increase over the comparable composites. Additionally, fracture surface analysis indicated that the bonding between coated diamond particles of the invention and bond matrix is stronger than the bonding between uncoated diamond particles in the same bond matrix.

Saw Blade Examples. Saw blades made with diamond particles having 40/50 mesh size commercially available from Diamond Innovations, Inc. as MBS 945 were coated for a tortuosity of about 1.1 and were compared with saw blades made with uncoated diamond particles commercially available from Diamond Innovations, Inc. under the trade name MBS 970. MBS 970 is sold as a higher grade diamond than MBS 945. Test results indicated that the blades comprising the coated diamond particles demonstrated at least 50% longer useful life than uncoated higher grade diamond blades. Additionally, the blades employing the coated particles of the invention exhibited better cutting capability and used less power (20% less power than uncoated MBS 970) for the same amount of cutting work than the saw blades employing uncoated abrasive particles.

The blade tests further illustrated that the saw blade comprising the coated particles have the same cutting capacity as saw blades comprising uncoated particles despite the fact that the saw blade with uncoated particles had a concentration of 18% more particles as compared to the saw with coated particles.

Grinding wheel Examples. Grinding wheels made with diamond particles having 80/100 mesh size commercially available from Diamond Innovations, Inc. under the trade name MBG 660 were coated to a tortuosity (T) of about 1.05 and of about 1.15. These Grinding wheels having tortuously coated particles were compared with a grinding wheel made with uncoated diamond particles having the same particle size (MBG 660). Test results from grinding ceramic oxides indicated 23% reduction on diamond particle pull-out with T=1.05 over uncoated diamond grinding wheel and 81% reduction on diamond particle pull-out with T=1.15 over uncoated diamond grinding wheel.

Some of the preferred embodiments have been set forth in this disclosure for the purpose of illustration only. However, the foregoing description should not be deemed to be a limitation on the scope of the invention. Accordingly, various modifications, adaptations, and alternatives may occur to one skilled in the art without departing from the spirit and scope of the claimed inventive concept.

What is claimed is:

1. A composite material comprising:
   a plurality of coated abrasive particles in a metal matrix, wherein the abrasive particles are coated with a coating comprising:
   an inner layer comprising one or more materials selected from the group consisting of chromium, tungsten, molybdenum, titanium, zinc, palladium, carbides, borides, nitrides, oxides, and mixtures thereof; and
   an outer layer comprising an outer layer material selected from the group consisting of nickel, cobalt, iron, an alloy of nickel and phosphorus, an alloy of cobalt and phosphorus, an alloy of iron and phosphorus, an alloy of nickel and boron, an alloy of cobalt and boron, an alloy of iron and boron, intermetallics, and mixtures thereof, wherein the outer layer further comprises a surface topography comprising at least 5 spikes that comprise the outer layer material; and
   wherein the outer layer has a tortuosity T of at least about 1.1.

2. The composite material of claim 1, wherein the metal matrix comprises a metal selected from the group consisting of Ni, Cu, Fe, Co, Sn, W, Ti, an alloy thereof, and a mixture thereof.

3. The composite material of claim 1, wherein the abrasive particles are selected from the group consisting of diamond, cubic boron nitride, boron suboxide, aluminum oxide, silicon carbide, zirconia-alumina, garnet, emery, flint, and mixtures thereof.

4. The composite material of claim 1, wherein the abrasive particles have a particle size of about 2 μm to about 200 μm.

5. The composite material of claim 1, wherein the outer layer comprises a coating having a thickness of about 2 μm to about 100 μm.

6. The composite material of claim 1, wherein the coated abrasive particles are present in a concentration of about 10% to about 100% by volume of the composite.

7. The composite material of claim 1, wherein the matrix comprises an alloy having an operating temperature in the range of about 600-1150° C.

8. The composite material of claim 1, wherein the composite material is included in an article that is selected from the group consisting of a tool blank, a wire die, a drill blank, a grinding wheel, a saw blade, a wire saw, a drill, a honing tool, and a bearing element.

9. A composite material comprising:
a plurality of abrasive particles in a metal matrix, wherein the abrasive particles are coated with a coating, the coating comprising an inner layer comprising one or more materials selected from the group consisting of chromium, tungsten, molybdenum, titanium, zinc, palladium, carbides, borides, nitrides, oxides, and mixtures thereof; and
the coating further comprising an outer layer, comprising a metal alloy;
wherein a base metal of the metal alloy is selected from the group consisting of cobalt, nickel, and copper; and
wherein an alloying element of the metal alloy is selected from the group consisting of Al, Ag, B, C, Co, Cu, Cr, Mg, Mn, P, Pd, Pt, Mo, Ni, Si, Sn, Ti, W, Y, Zn, Zr, and a mixture thereof;
wherein the outer layer has an outer surface topography comprising at least 5 spikes, and the spikes are also comprised of the one or more metals or metal alloys; and
wherein the coated particles have a tortuosity T of at least about 1.1.

10. The composite material of claim 9, wherein the metal matrix further comprises a metal selected from the group consisting of Ni, Cu, Fe, Co, Sn, W, Ti, alloys thereof, and mixtures thereof.

11. The composite material of claim 9, wherein the abrasive particles are selected from the group consisting of diamond, cubic boron nitride, boron suboxide, aluminum oxide, silicon carbide, zirconia-alumina, garnet, emery, flint, and mixtures thereof.

12. The composite material of claim 9 wherein the composite material is included in an article that is selected from the group consisting of a tool blank, a wire die, a drill blank, a grinding wheel, a saw blade, a wire saw, a drill, a honing tool, arid a bearing element.

13. The composite material of claim 1, further comprising an intermediate layer;
wherein the intermediate layer is between the inner layer and the outer layer;
wherein the intermediate layer comprises a metal alloy;
wherein a base metal of the metal alloy is selected from the group consisting of cobalt, nickel, and copper; and
wherein an alloying element is selected from the group consisting of Al, Ag, B, C, Co, Cu, Cr, Mg, Mn, P, Pd, Pt, Mo, Ni, Si, Sn, Ti, Zn, W, Y, Zn, Zr, and a mixture thereof.

14. The composite material of claim 9, further comprising an intermediate coating layer;
wherein the intermediate layer is between the inner layer and the outer layer;
wherein the intermediate layer comprises a metal alloy;
wherein a base metal of the metal alloy is selected from the group consisting of cobalt, nickel, and copper; and
wherein an alloying element is selected from the group consisting of Al, Ag, B, C, Co, Cu, Cr, Mg, Mn, P, Pd, Pt, Mo, Ni, Si, Sn, Ti, Zn, W, Y, Zn, Zr, and a mixture thereof.

15. A composite material comprising:
a plurality of coated abrasive particles in a ceramic matrix, wherein the abrasive particles are coated with a coating comprising:
an inner layer comprising one or more materials selected from the group consisting of chromium, tungsten, molybdenum, titanium, zinc, palladium, carbides, borides, nitrides, oxides, and mixtures thereof; and
an outer layer comprising an outer layer material selected from the group consisting of nickel, cobalt, iron, an alloy of nickel and phosphorus, an alloy of cobalt and phosphorus, an alloy of iron and phosphorus, an alloy of nickel and boron, an alloy of cobalt and boron, an alloy of iron and boron, intermetallics, and mixtures thereof,
wherein the outer layer further comprises a surface topography comprising at least 5 spikes that comprise the outer layer material; and
wherein the outer layer has a tortuosity T of at least about 1.1.

16. The composite material of claim 15, wherein the ceramic matrix comprises an oxide selected from the group consisting of $SiO_2$, $Al_2O_3$, ZrO, and MgO.

17. The composite material of claim 15, wherein the abrasive particles are selected from the group consisting of diamond, cubic boron nitride, boron suboxide, aluminum oxide, silicon carbide, zirconia-alumina, garnet, emery, flint, and mixtures thereof.

18. The composite material of claim 15, wherein the outer layer comprises a-coating having a thickness of about 2 μm to about 100 μm.

19. The composite material of claim 15, wherein the coated abrasive particles are present in a concentration of about 10% to about 10% by volume of the composite material.

20. The composite material of claim 15, wherein the composite material is included in an article that is selected from the group consisting of a tool blank, a wire die, a drill blank, a grinding wheel, a saw blade, a wire saw, a drill, a honing tool, and a bearing element.

21. The composite material of claim 15, further comprising an intermediate layer;
wherein the intermediate layer is between the inner layer and the outer layer;
wherein the intermediate layer comprises a metal alloy;
wherein a base metal of the metal alloy is selected from the group consisting of cobalt, nickel, and copper; and
wherein an alloying element is selected from the group consisting of Al, Ag, B, C, Co, Cu, Cr, Mg, Mn, P, Pd, Pt, Mo, Ni, Si, Sn, Ti, Zn, W, Y, Zn, Zr, and a mixture thereof.

* * * * *